United States Patent
Narayana et al.

(10) Patent No.: US 6,366,979 B1
(45) Date of Patent: *Apr. 2, 2002

(54) APPARATUS AND METHOD FOR SHORTING RETRANSMIT RECOVERY TIMES UTILIZING CACHE MEMORY IN HIGH SPEED FIFO

(75) Inventors: Pidugu L. Narayana, Santa Clara, CA (US); Daniel Eric Cress, Starkville, MS (US); Ping Wu, Austin, TX (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,845

(22) Filed: Dec. 16, 1997

(51) Int. Cl.$^7$ .......................... G06F 12/00; G06F 13/00
(52) U.S. Cl. ...................... 711/109; 711/118; 711/154; 365/220; 365/221; 365/230
(58) Field of Search ................................ 365/219, 220, 365/189.04, 230.05, 222, 221, 189; 710/52; 711/143, 209, 118, 105, 109, 3

(56) References Cited

U.S. PATENT DOCUMENTS

| | | | | | |
|---|---|---|---|---|---|
| 5,317,720 A | * | 5/1994 | Stamm et al. | ............... | 711/118 |
| 5,319,766 A | * | 6/1994 | Thaller et al. | ............... | 711/118 |
| 5,388,247 A | * | 2/1995 | Goodwin et al. | ............ | 711/143 |
| 5,461,718 A | * | 10/1995 | Tatosian et al. | ............ | 711/206 |
| 5,901,100 A | * | 5/1999 | Taylor | ........................ | 365/219 |

OTHER PUBLICATIONS

Pidugu L. Narayana et al., U.S.S.N. 08/768,407, now patent 5860160 High Speed FIFO and Retransmit Scheme, filed Dec. 18, 1996.

* cited by examiner

Primary Examiner—Tuan V. Thai
(74) Attorney, Agent, or Firm—Christopher P. Maiorana, P.C.

(57) ABSTRACT

A memory circuit that allows for short retransmit recovery times by implementing a read cache memory in a FIFO device. A circuit comprising a memory array, a cache memory and a logic circuit. The memory array includes a read pointer, a write pointer and a plurality of memory rows. The cache memory is configured to store one or more memory data bits. The logic circuit is further configured to control the output of the circuit by presenting either (i) an output from the memory array or (ii) an output from the cache memory.

18 Claims, 3 Drawing Sheets

APPARATUS AND METHOD FOR SHORTING RETRANSMIT RECOVERY TIMES UTILIZING CACHE MEMORY IN HIGH SPEED FIFO

FIELD OF THE INVENTION

The present invention relates to FIFOs generally, and more particularly, to a high speed FIFO retransmit method and apparatus.

BACKGROUND OF THE INVENTION

First-in First-out (FIFO) buffers may use retransmit schemes to allow a user to return to the first location in the FIFO and re-read data. When a retransmit is asserted, the read pointer returns to the first location. For proper operation of the retransmit, the write pointer should not pass the first location.

Certain known constraints hinder the ability of the retransmit function to have a quick recovery time. Look ahead architectures may be implemented in high performance FIFOs to allow the read pointer to look ahead of its current location so that the information may be accessed faster during a read from the FIFO. A retransmit scheme may interrupt the look ahead architecture due to precharging requirements of the bitlines. Data corruption due to charge sharing on the bitlines may occur without the proper precharge time. To avoid data corruption due to charge sharing, the bitlines of the FIFO should be precharged before the read wordlines are asserted. The FIFO must then initiate a bitline precharged cycle upon the assertion of a retransmit. The more words there are in the memory array, the longer the precharge cycle time. For large memory arrays, the long precharge cycle creates an unacceptably long retransmit recovery time.

Referring to FIG. 1, a circuit 10 is shown illustrating a previous retransmit system implemented with registers to store data for retransmit. The circuit 10 generally comprises a write in register 12, a retransmit lower register 14, a retransmit upper register 16, a holding register 18, a read out register 20 and a read hold register 22. A write data signal is received at an input 24 of the write in register 12. The write data signal is also presented to a bus 26. The bus 26 presents an output 28 representing the read data. The write in register 12 has an output 30 that presents a signal to a bus 32 as well as to an input 34 of the write hold register 18. The bus 32 generally presents a signal to the bus 26. The register 14 is connected through a bus 36 to the bus 32. Similarly, the registers 16 are connected through a bus 38 to the bus 32. The write hold register 18 has an output 40 that presents a signal to the bus 32. The read out register 20 presents a signal on an output 42 to the bus 32. The read out register 20 has an input 44 that receives a signal from the read hold register 22. The read hold register 22 has an input 46 that receives a signal from the memory array. The write hold register 18 also has an output 48 that presents a signal to the memory array. The retransmit lower register 14 and the retransmit upper register 16 store the information when the initial words are read from the memory array. After a retransmit, data is read from the registers 14 and 16. However, the bitlines must first be precharged before reading, which may interrupt the look ahead architecture. While the registers accommodate the precharge, they generally require complex logic and consume a large amount of area on the chip.

The write in register 12, the retransmit lower register 14, the retransmit upper register 16, the write hold register 18, the read out register 20 and the read hold register 22 may be generally implemented as 32-bit registers, as shown in FIG. 1. While the circuit 10 may provide the appropriate retransmit scheme, it becomes cumbersome to create such numerous wide bit registers.

SUMMARY OF THE INVENTION

The present invention concerns a circuit and method comprising a memory array, a cache memory and a logic circuit. The memory array may include a read pointer, a write pointer and a plurality of rows. The cache memory may be configured to store one or more bits. The logic circuit may be configured to control the output of the circuit by presenting either (i) an output from the memory array or (ii) an output from the cache memory.

The objects, features and advantages of the present invention include providing an architecture that allows for short retransmit recovery times by implementing a read cache in a FIFO device. The present invention allows an incremental granularity of a retransmit cache by implementing the cache in "word" increments, provides scaleability to allow more cache to be added as recovery time requirements increase, and provides a logic implementation that may be independent of the technology, memory cell and data path architecture implemented on the specific cell.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention provides a look ahead architecture to satisfy high speed FIFO operations. A retransmit cache may be used to satisfy the retransmit recovery time constraints in a retransmit system while allowing a full bitline precharge. A retransmit cache may be implemented separately from the memory cells to store information to be used in the event of a subsequent retransmit. The data to be retransmitted may initially be retrieved from the retransmit cache when the retransmit is asserted, allowing a full precharge cycle after which reading from the memory array may resume.

Figure 2:
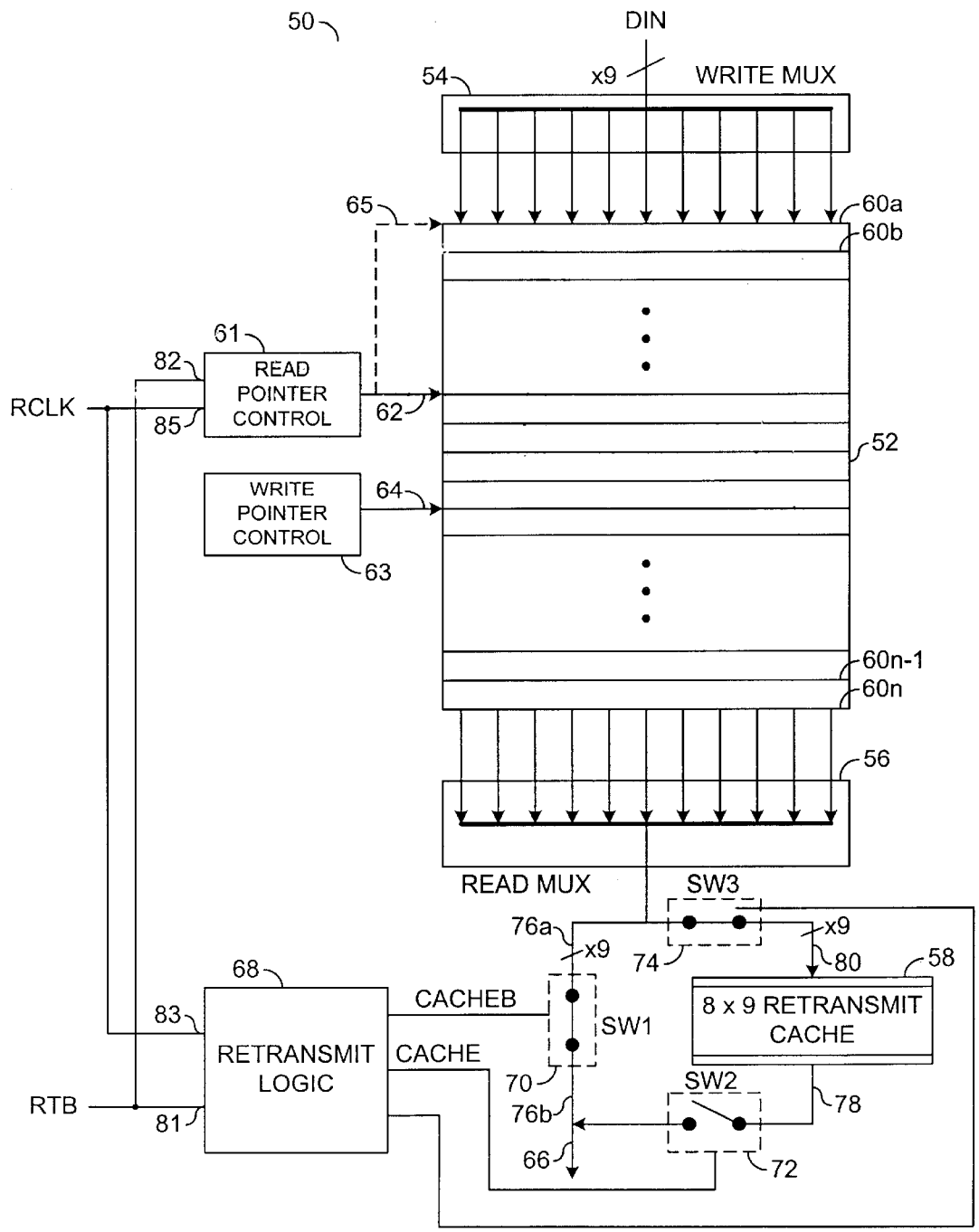
FIG. 2 is a block diagram of the data path of a architecture implementing a retransmit in accordance with a preferred embodiment of the present invention.

Referring to FIG. 2, a block diagram of a circuit 50 implementing a look ahead architecture according to a preferred embodiment of the present invention is shown. The circuit 50 generally comprises a memory array section (or circuit) 52, a write multiplexor section (or circuit) 54, a read multiplexor section (or circuit) 56 and a retransmit cache section (or circuit) 58. The memory array section 52 may be implemented as a number of singlesided dual port (SSDP) memory cells (or other memory cells), where a typical access time may be in the range of approximately 80 ns and a typical read bitline precharge time may also be in the range of approximately 80 ns. The memory section 52 generally comprises a number of rows 60a–60n. The rows 60a–60n may be turned on in response to a number of wordlines. A read pointer control block (or circuit) 61 generally controls a read pointer 62 that progresses through the rows 60a–60n in a generally incremental fashion (e.g., from the row 60a to the row 60b, etc.). The read pointer control block 61 may include an input 65 that may receive a reference clock (e.g., a signal RCLK). A write pointer control block (or circuit) 63 generally controls a write pointer 64 that also generally progresses through the rows 60a–60n in a generally incremental fashion. During a retransmit condition, the read pointer 62 may be reset back to the row 60a. The reset of the read pointer 62 during the retransmit condition is generally indicated by the arrow 65. Prior to a retransmit, additional information may be stored in the retransmit cache 58 that generally represents the information stored in the initial portion of the memory array 52 (e.g., the row 60a). The additional information stored in the retransmit cache 58 is generally presented at a data output 66 at a time initially following the retransmit condition. The initial reading from the retransmit cache 58 generally allows the bitlines of the memory array 52 sufficient time to properly precharge prior to reading data directly from the memory array 52.

The circuit 50 additionally comprises a retransmit logic block (or circuit) 68. The retransmit logic block 68 generally presents control signals to a switch 70 (e.g., SW1), a switch 72 (e.g., SW2) and a switch 74 (e.g., SW3). The control signals presented to the switch 70 and the switch 72 are generally complementary signals (e.g., a signal CACHE and a signal CACHEB). As a result, the data read and presented at the data output 66 (e.g., Dout) may be retrieved directly from the memory array 52, through a multi-bit bus 76a, when the switch 70 is in a closed position. In the alternative, data may be retrieved from the retransmit cache 58, through a bus 78, when the switch 72 is closed. The switch 74 generally controls the loading of the retransmit cache 58 through a bus 80 (to be described in more detail in connection with FIG. 3). The retransmit logic 68 may include an input 81 that may receive the retransmit signal (e.g., a signal RTB) and an input 83 that may receive the signal RCLK. Alternatively, the retransmit logic block 68 may include an internal clock which may eliminate the input 83. The retransmit signal may be an externally generated signal that indicates a retransmit should be executed. The retransmit signal may also be presented to an input 82 of the read pointer control block 61. As a result, when the retransmit is executed, the read pointer 62 will generally reset back to the row 60a. However, since the switch 70 will generally be open after a retransmit condition, and the switch 72 will generally be closed after a retransmit condition, the initial data will generally be read from the retransmit cache 58. After the initial data is read from the retransmit cache 58, the retransmit logic 68 generally inverts the control signals presented to the switches 70 and 72 and data is subsequently read from the memory array 52.

The retransmit cache 58 may be independently scalable without regard to the size of the memory array 52. The retransmit cache 58 generally comprises a number of latches. In one example, eight latches may be implemented, one for each bit of data read in parallel, in a system presenting an 8-bit word as a data input. The latches may be implemented in parallel with the data output path. In an example where the retransmit cache 58 is implemented as a 8-level deep device with 9-bit words, a total of 72 (e.g., 8×9) latches may be implemented. Other cache depths may be implemented accordingly to meet the design criteria of a particular application. Latches or registers may be used to implement the retransmit cache 58 since they are durable memory devices that generally do not require precharging prior to reading. However, other devices that do not require precharging may be implemented accordingly to meet the design criteria of a particular application.

Figure 1:
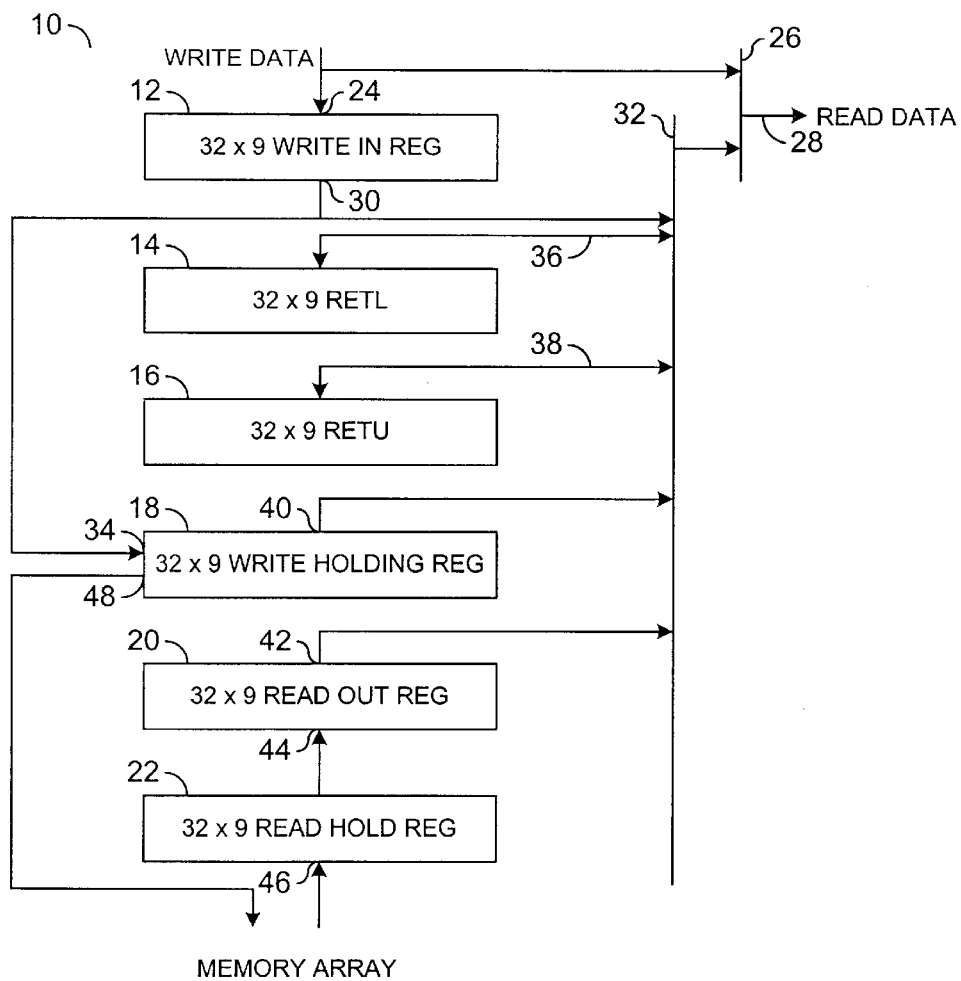
FIG. 1 is a block diagram of a previous approach for implementing a retransmit function with registers to store data for a retransmit.
Figure 3:
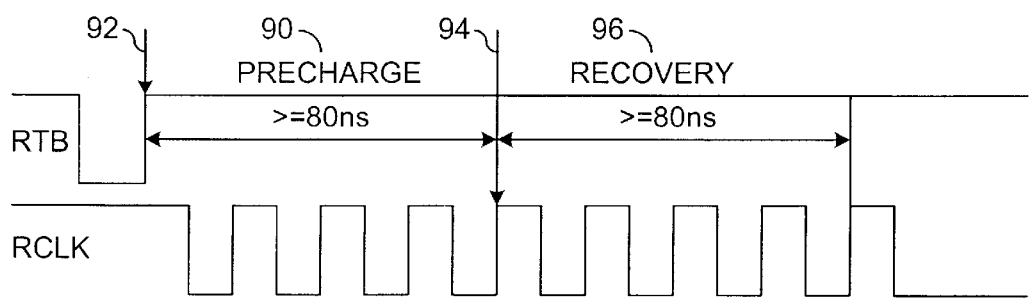
FIG. 3 is a timing diagram of a retransmit illustrating the precharging of the bitlines.

Referring to FIG. 3, a waveform 90 illustrating the precharge times is generally shown. If the first eight words have not all been read from the retransmit cache 58, no precharging is generally required. Otherwise, the initialization of a read bitline precharge cycle may be executed. In such a case, the words must generally be read from the retransmit cache 58. In one example, a precharge time 90 is shown after the signal RTB transitions high at a time 92. The precharge generally lasts for eight transitions (both positive and negative) of the clock signal RCLK, which generally ends at a time 94. A recovery time 96 generally occurs after the time 94. Other precharge and recovery times may be implemented accordingly to meet the design criteria of a particular application.

A special case may occur when a minimum number of reads have not been executed from the memory array 52. For example, if 32 reads for the row 60a (in the example of a 32-bit word) are not executed prior to the read pointer 62 progressing to the next row 62b, then the initial row 60a does not need a precharge time since the row 60a remains precharged from the previous reads. During such a condition, the retransmit logic 68 generally presents the signals CACHE and CACHEB in a configuration that allows the switch 70 to be closed and the data out to be read from the memory array 52. The number of cells (and corresponding reads) contained in a particular row 60a–60n may be increased as processing technology allows larger numbers of cells to be implemented in a smaller area. Additionally, the number of cells in each rows 60a–60n may be reduced to meet certain design constraints. In any event, when the total number of reads from the row 60a have not yet occurred, the retransmit logic 60a generally does not invoke the retransmit cache 58.

The switch 74 may also be controlled by the retransmit logic 68 and may be turned on during the initial reading of the memory array 52. The switch 74 is generally kept on until the retransmit cache 58 is filled. However, in certain design applications, the retransmit cache may be implemented to store data equal to one or more of the rows 60a–60n or to store data equal to less than a full row. The switch 70, the switch 72 and the switch 74 may be implemented as transistors having gates connected to the respective control signals received from the retransmit logic block 68.

Figure 4:
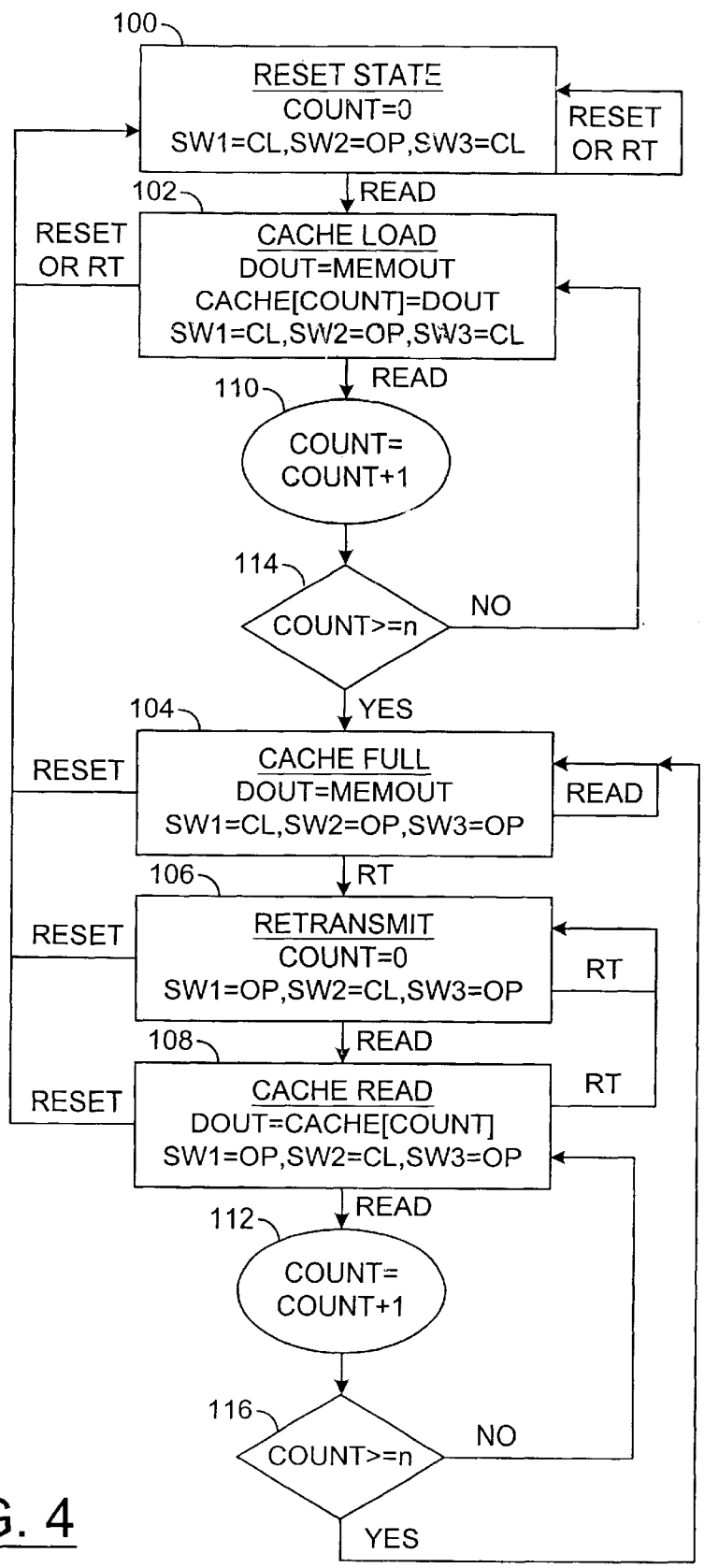
FIG. 4 is a flow chart implementing the retransmit logic of FIG. 2.

Referring to FIG. 4, a flow chart illustrating an implementation of the retransmit logic 68 is shown. The control logic 68 may be implemented in discrete logic, a programming language (such as verilog hardware description language (HDL) as defined by the IEEE 1364-1995 standard) or any other appropriate implementation. The retransmit logic 68 generally comprises a reset state 100, a cache load state 102, a cache full state 104, a retransmit state 106 and a cache read state 108. Each of the states 100–108 generally responds to the retransmit signal RTB, the read clock signal RCLK and the state of the data presented at the output 66 (e.g., Dout). The states 100–108 may also respond to an external reset signal (not shown). Each of the states 100–108 generally presents signals (e.g., CACHE and CACHEB) that control the switch SW1, the switch SW2 and the switch SW3. The state of the switches SW1, SW2 and SW3 is generally indicated as closed (e.g., Cl) or open (e.g., Op). As described in connection with FIG. 2, the state of the switch SW1 may be complementary to the state of the switch SW2. The retransmit logic 68 may also comprise a count increment section 110, a count increment section 112, a decision section 114 and a decision section 116. In general, the retransmit logic 68 provides output to the switches SW1, SW2 and SW3 at each of the states 100–108.

The reset state 100 generally implements a state of the retransmit logic 68 after a reset. In the reset state 100, the switch SW1 is generally closed, the switch SW2 is generally open and the switch SW3 is generally closed. An internal read count signal may be set to zero. As a result, data is generally presented at the output 66 from the memory array 52 and the retransmit cache 58 is generally loaded with the data. After a read occurs, the retransmit logic 68 generally exits the reset state 100 and enters the cache load state 102.

The states of the switches SW1, SW2 and SW3 during the cache load state 102 generally remain the same as in the reset state 100. If a reset or retransmit occurs during the cache load state 102, the retransmit logic 68 generally exits the cache load state 102 and returns to the reset state 100. When a subsequent read occurs, the count increment section 110 generally increments the internal count signal by one. Next, the decision state 114 determines if the value count is greater than or equal to n, where n is generally equal to the depth of the retransmit cache 58. If the count signal is not greater than or equal to n, the retransmit logic 68 generally remains in the cache load state 102. After a number of reads equal to n occurs, the retransmit logic 68 enters the cache full state 104.

If a reset occurs during the cache full state 104, the retransmit logic 68 generally returns to the reset state 100. If a read occurs, the retransmit logic 68 generally remains in the cache full state 104. During the cache full state 104, the switch SW1 is generally closed, the switch SW2 is generally open and the switch SW3 is generally open. This logic combination generally prevents additional information from being written to the retransmit cache 58 during this cache full state 104. After a retransmit occurs, the retransmit logic 68 generally exits the cache full state 104 and enters the retransmit state 106.

During the retransmit state 106, the count value is generally reset to zero, the switch SW1 is changed to an open state, the switch SW2 is changed to a closed state and the switch SW3 remains in the open state. If a reset occurs, the retransmit logic 68 generally returns to the reset state 100. If an additional retransmit occurs, the retransmit logic 68 generally remains in the retransmit state 106. If a read occurs, the retransmit logic 68 generally progresses to the cache read state 108.

During the cache read state 108, the switch SW1 is generally open, the switch SW2 is generally closed and the switch SW3 is generally open. The count signal is generally reset to the data out signal. If a reset occurs, the retransmit logic 68 generally returns to the reset state 100. If a retransmit occurs, the retransmit logic 68 generally returns to the retransmit state 106. If a read occurs, the retransmit logic 68 generally executes the count increment section 112 and the decision section 116. If the count is not greater than or equal to n, the retransmit logic remains in the read cache state 108. If the count is greater than or equal to n, the retransmit logic 68 generally returns to the cache full state 104. As a result of the retransmit logic 68, the proper operation of the switch SW1, SW2 and SW3 is generally maintained throughout the various possibilities of reset, retransmit and read that may be possible in the circuit 50.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    a memory array comprising (i) a read pointer, (ii) a write pointer and (iii) a plurality of rows;
    a cache memory (i) having an input coupled to an output of said memory array and (ii) configured to store data representing information stored in an initial portion of said memory array;
    a first switch configured to couple an output of the memory array to a data output path; and
    a second switch configured to couple an output of the cache memory to said data output path,
    wherein (i) said first and second switches are controlled by a logic circuit and (ii) said data representing information stored in said initial portion of said memory array is read from said cache memory only during a retransmit condition and when said memory array is unable to be read.

2. The circuit according to claim 1, wherein said memory array comprises a plurality of single sided dual port memory cells.

3. The circuit according to claim 1, wherein said information stored in said cache memory is received from said memory array via a switching circuit.

4. The circuit according to claim 1, wherein said circuit resumes reading from said memory array after said cache memory has been read.

5. The circuit according to claim 1, wherein said cache memory comprises one or more latches.

6. The circuit according to claim 1, wherein said cache memory comprises one or more registers.

7. The circuit according to claim 1, wherein said first and second switches are controlled in a complementary fashion.

8. The circuit according to claim 7, further comprising a third switch configured to couple the output of said memory array to said input of said cache memory during an initial operation of the circuit, wherein said third switch is controlled by said logic circuit.

9. The circuit according to claim 1, wherein said circuit comprises a FIFO memory configured to minimize retransmit recovery time.

10. The circuit according to claim 1, wherein said memory array further comprises:
    an input multiplexer circuit configured to receive data to be stored in said memory array; and
    an output multiplexer circuit configured to present data retrieved from said memory array to (i) said output data path and (ii) said input of said cache memory.

11. A method for retransmitting data from a memory comprising the steps of:
    (A) writing data to or reading data from a memory array comprising (i) a read pointer, (ii) a write pointer and (iii) a plurality of rows;
    (B) storing a copy of an initial portion of said data in a cache memory;
    (C) presenting information read from said memory array through a first switch at a data output when said memory array is accessible for reading; and (D) presenting said copy of said initial portion from the cache memory through a second switch at said data output only during a retransmit condition and when said memory array is not accessible for reading.

12. The method according to claim 11, further comprising the step of:

writing to said cache memory during an initial operation of the circuit.

13. The method according to claim 11, further comprising the step of:

presenting said output of said cache memory during a precharge condition of one of said rows of said memory array.

14. The method according to claim 11, further comprising the steps of:

resetting said read pointer to an initial address of said memory array in response to said retransmit condition;

precharging one or more bitlines of said memory array in response to said read pointer being reset; and reading said copy of said initial portion from said cache memory while said bitlines are being precharged.

15. The method according to claim 14, further comprising the step of:

reading from said memory array once said bitlines are precharged.

16. A circuit comprising:

a first memory comprising (i) a read pointer, (ii) a write pointer and (iii) a plurality of rows, wherein said read pointer is reset in response to a retransmit condition;

a second memory coupled to said first memory and configured to store a copy of an initial portion of information written to said first memory;

a switching circuit configured to couple a data output path (i) to said first memory in response to a first state of a control signal and (ii) to said second memory in response to a second state of said control signal; and a logic circuit configured to generate said control signal in response to said retransmit condition, wherein said copy of said initial portion of information is read from said second memory in response to said retransmit condition when said first memory is unable to read said information.

17. The circuit according to claim 16, wherein reading from said second memory stops when said first memory is able to read said information.

18. The circuit according to claim 16, further comprising:

a second switching circuit configured to couple said first memory to said second memory in response to a second control signal generated by said logic circuit.

* * * * *